Jan. 29, 1952  J. S. JENSON ET AL  2,583,946
CALCULATING AND INDICATING DEVICE
Filed Nov. 28, 1950  2 SHEETS—SHEET 1
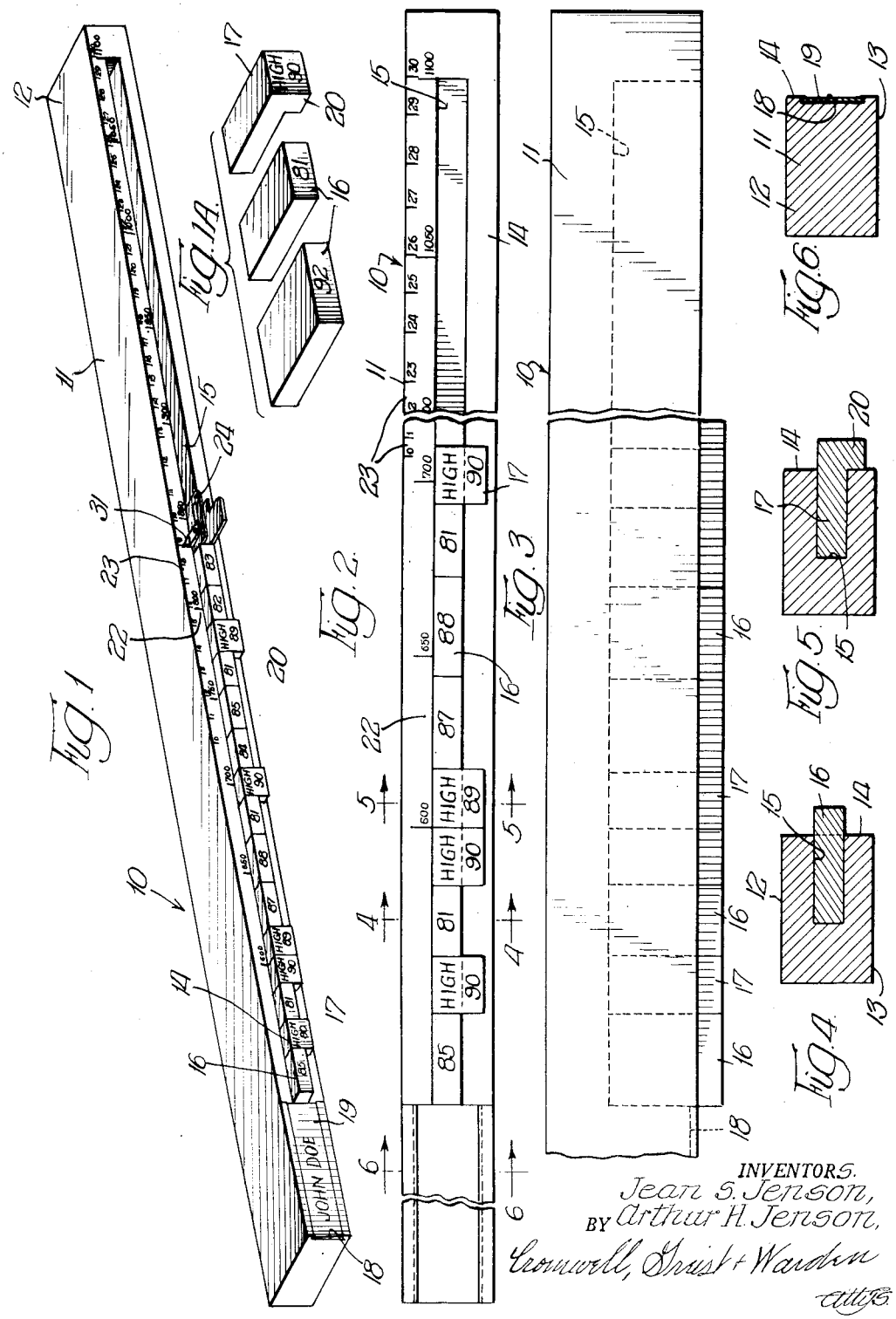
INVENTORS.
Jean S. Jenson,
BY Arthur H. Jenson, Jan. 29, 1952     J. S. JENSON ET AL     2,583,946
CALCULATING AND INDICATING DEVICE
Filed Nov. 28, 1950     2 SHEETS—SHEET 2
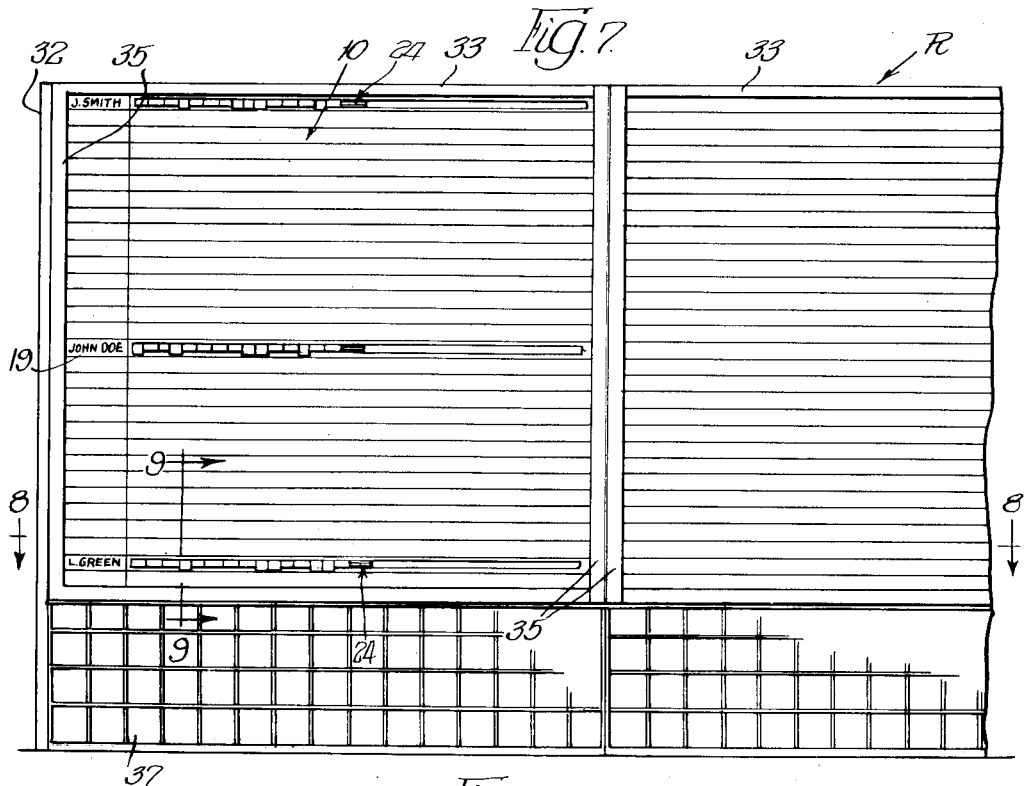
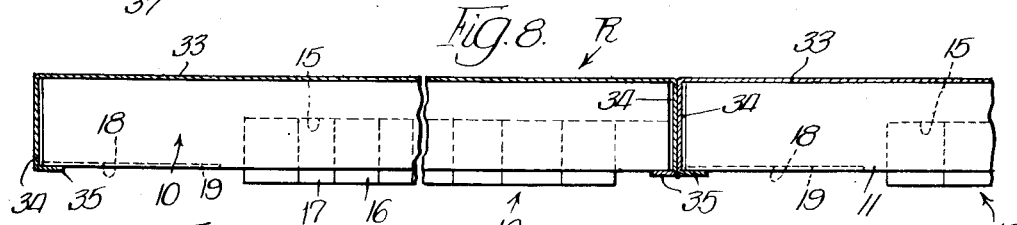
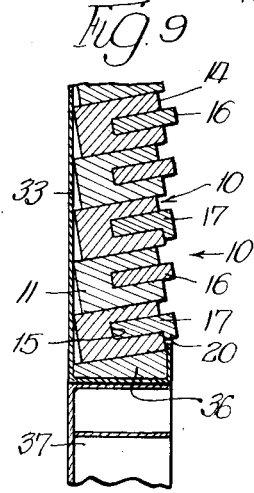
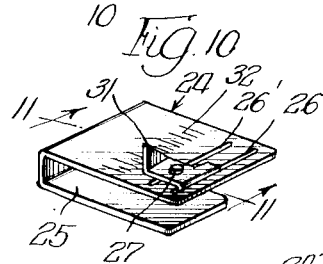
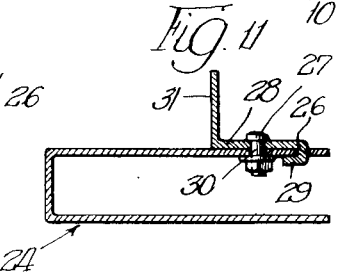
INVENTORS.
Jean S. Jenson,
BY Arthur H. Jenson,
Cromwell, Greist & Warden
ATTYS.

Patented Jan. 29, 1952

2,583,946

UNITED STATES PATENT OFFICE 2,583,946

CALCULATING AND INDICATING DEVICE

Jean S. Jenson, Chicago, and Arthur H. Jenson, Evanston, Ill.

Application November 28, 1950, Serial No. 197,970

2 Claims. (Cl. 235—61)

1

The present invention relates to a simple and inexpensive device for making calculations based on the averaging and interpreting of quantities, values, scores, etc., and more particularly, for making calculations which involve the automatic application of a predetermined percentage or other factor to an average which is automatically obtained, thereby to afford an interpretive result which may be expressed in any one of a number of different ways. As an illustration of an application of the device, to which, however, it is not necessarily limited, we have chosen a procedure of calculating handicaps for golf, a sport in which the players are commonly handicapped. Bowling is another example. In such an application, the device, generally considered, employs a number of arbitrarily shaped component pieces which bear predetermined relation, in one of their dimensions, to individual scores upon which the ultimate handicap is based according to accepted rules of handicapping.

In further explanation of the above statements, bearing on the specific handicap calculating adaptation of the invention which has been chosen for purpose of illustration, representative sporting associations have adopted definite rules for the handicapping of players of all degrees of proficiency, whereby the competitive advantages of the game may be enjoyed and cultivated by encouraging direct competition, on as fair a basis as is possible, of players of quite widely differing skill. The handicapping system constituted by such rule contemplates that an individual golfer's handicap, representing approximately and in arbitrary terms his degree of skill in the sport, shall be kept current in accordance with changes in his scoring over reasonably short periods. It is contemplated that the player's handicap shall increase to reflect bad scores and shall decrease to reflect good or better scores. Thus players of differing proficiency may compete with one another on a fair basis by subtracting from the higher score of the higher handicap player the difference between his handicap and that of his more skilled opponent. Of course, in bowling the adjustment would be additive, the higher handicap bowler receiving an additional number of pins equal to the difference in handicaps.

At the same time, especially in golf handicapping, the desirability of eliminating certain freak high scores which bear no relation to a player's usual and real ability is recognized. Therefore, a representative system of handicapping, actually that employed by the Chicago District Golf Association, provides for the multiplying by a factor of 80% of the difference between the course rating and the average of the lowest 10 of the last 15 scores which have been made by a player. The course rating is the par score of the particular golf course in question based primarily on the length of the same.

It is evident that a computation of this sort, if performed by pencil and paper involves the following manipulations or calculations: (a) selection of the lowest 10 of the last 15 scores, which will change as scores are handed into the handicapper; (b) addition thereof; (c) dividing by 10; (d) subtraction of the course rating from the decimalized sum, usually larger than par for the course; (e) multiplication of the resultant figure by 80%; and (f) the recording or posting of the resultant handicap on a suitable sheet usually kept for that purpose. While arbitrary tabulations are available by reference to which the handicap figure may be read off once the total of the 10 selected scores is known, it remains true that tedious manual operations are still left as the duty of the handicapper. When it is considered that he must maintain current the handicaps of all members of a club of say 300–500 membership, the inconvenience and tediousness of the job are obvious.

The handicapping of sports participants is a striking example of a field in which the device of the invention has utility. Other adaptations to calculations involving the averaging of other values will be readily perceived. For instance, daily production outputs, daily sales, etc., may be averaged, accompanied, furthermore by comparison of the average value with another value, by the application of a rate or other factor to the average or the resultant, or by other related manipulations, if the nature of the calculation so requires.

Briefly, it is a general object of the invention to provide a simple and inexpensive, easily manipulated device for quickly and automatically arriving at an arbitrary interpretation, which interpretation is based on a mathematical procedure involving the averaging of certain values and, usually, the applying to the average of a predetermined factor to convert the same to an interpreted term or value.

More specifically it is an object of the invention to provide a handicapping or calculating device of the foregoing general description in which a set of separate pieces is employed which vary arbitrarily in a common dimension in accordance with, or in proportion to, the scores or other values upon which the calculation is based; in which these pieces are arranged serially with regard to the common dimension referred to, and, in a specific adaptation of the invention, with other serially arranged pieces which have a like, unvarying common dimension; and in which the total length of the series of pieces, in the direction of the dimension referred to, may be visually observed with relation to a holder for the pieces, or other coacting unit, which holder or unit is properly calibrated so that the handicap or other desired interpretation may be read directly from the calibration of the holder or unit by reference to the endmost piece of the series.

Still more specifically, in the case of a golf handicap calculator, it is an object of the invention to provide a device comprising an elongated holder having a groove or equivalent provisions for the reception of a series of pieces each having one of its dimensions proportionately reflecting a score upon which the computation is based, together with an indicator movably associated on said holder adjacent one end of a series of such pieces, and variably positioned lengthwise of the holder in accordance with the total length of a predetermined number of the pieces, the holder being calibrated lengthwise in terms of handicap values for coaction with the thus positioned indicator, thereby to enable an observer to read off from the calibration the handicap of a player whose current scores are represented by the series of pieces.

Yet another object of the invention is to provide a handicapping system or the like including a plurality of individual calculating devices of the sort referred to in the preceding paragraphs, each appropriately identified by the name of the player or other person to which the calculations relate, together with an appropriate receiver for a plurality of such devices, adapted to hold the same in convenient position for inspection and manipulation, so that the devices pertaining to a number of players may be removably arranged and maintained in proper alphabetical order.

The foregoing statements are indicative in a general way of the nature of the invention, but other and more specific objects will be apparent to those skilled in the art upon a full understanding of the construction and operation of the device.

A single embodiment of the invention is presented herein for purpose of illustration and it will be appreciated that the invention may be incorporated in other modified forms coming equally within the scope of the appended claims.

In the drawings:

Fig. 1 is a perspective view illustrating one of the handicap calculating devices which have been chosen to illustrate the principles of the invention;

Fig. 1A is a perspective view showing the two types of calculating pieces which are employed in the illustrated form of the invention;

Fig. 2 is a face view of the device shown in Fig. 1;

Fig. 3 is a fragmentary top plan view of the device;

Figs. 4, 5 and 6 are, respectively, views in transverse vertical section along lines corresponding respectively to lines 4—4, 5—5 and 6—6 of Fig. 2;

Fig. 7 is a fragmentary view illustrating a rack structure in which a large number of the devices as illustrated in Figs. 1 through 6 may be replaceably received and maintained, so that the handicaps of the entire playing membership of a club may be kept current;

Figs. 8 and 9 are fragmentary views in enlarged scale in section along lines corresponding to lines 8—8 and 9—9, respectively, of Fig. 7;

Fig. 10 is a perspective view illustrating in still larger scale a form of slidable indicator adapted for use in the device of the invention; and Fig. 11 is a further enlarged view in cross section through the indicator of Fig. 10, along line 11—11 of that figure.

Referring to Figs. 1 through 6, the reference numeral 10 generally designates the device of the invention in an adaptation as an automatic calculator for golfing handicaps. As the description proceeds it will be perceived that the device is equally adaptable for automatic calculation of handicaps in other sports such as bowling and, still more broadly, in certain calculations based on values other than scores which involve, generally speaking, an averaging of a number of different contributing amounts or values and, in certain cases, the application of a factor of one sort or another to the resultant average in arriving at a desired interpretation, as mentioned above. Hence it is desired that the description to follow of the illustrated calculator be construed broadly and that the substitution of other contributing values and other resultant interpretations is contemplated.

The device 10 includes an elongated holder 11 which may be fabricated in any suitable manner of any suitable material. It is illustrated in the form of an elongated, block-like, slotted or grooved member presenting relatively wide upper and lower surfaces 12, 13 and a relatively narrow forward face 14. These relative proportions are solely for convenience and economy of space in use, in which a multiplicity of the devices 10 are involved. The forward face 14 is grooved relatively deeply to afford a partial depth, parallel sided slot or groove 15 extending along a major portion of its length. Slot 15 is adapted to slidably receive two types of specially sized and shaped, block-like calculating pieces 16, 17, respectively, to be described in greater detail. These are arranged in longitudinally extending, end-to-end relation along groove 15. The ends of the holder 12 are left unslotted to define the ends of groove 15. The left-hand end is preferably provided with an undercut slide way 18 in which an identifying card 19 for the player whose handicap is shown by the device may be inserted.

As clearly illustrated in Fig. 1A of the drawing, the block-like pieces 16, to be referred to as "active" pieces, inasmuch as pieces of this type proportionately represent actual different scores, all correspond in their vertical thickness and front-to-rear depth; however their width, or dimension between opposite vertical ends, differs in accordance with a predetermined rule, arbitrarily arrived at as follows:

Inasmuch as the course record of practically no 18 hole golf course is below 64 strokes or so, an arbitrary theoretical width representing a score of 60 strokes has been chosen as a basis to which increments of width are added in sizing the active pieces representing higher score. Obviously 60 will, in all probability represent the lowest possible score to be involved in a handicap to be calculated by the device 10. An arbitrarily chosen width increment of one-thirty-second inch is added to represent each additional stroke over 60. Thus, a piece corresponding to a score of 61 will be one-thirty-second inch longer than the 60 score piece and the 69 score piece will be nine-thirty-seconds inch longer; and the 88 score piece will be seven-thirty-seconds inch longer than the 81 score piece, etc. These arbitrarily chosen sizes and increments of size may be varied as desired; the important thing is that each piece proportionately represents, with reasonable accuracy, a score or other amount or value upon which the calculations performed by the device, handicapping or otherwise, are based to arrive at the ultimate result. The respective "active" pieces have indicated on their forward surface the score which they represent.

The "inactive" or "high" pieces 17 are shaped to be received in the groove in endwise abutting relation to one another or to pieces 16. There may be no need for these "high" pieces in certain calculations other than handicap computing to which device 10 is adapted. However, in performing automatically the calculations entailed by the rules of the special handicapping system referred to above, it is the function of the "high" pieces 17 to represent the five highest scores in a current series of 15 scores, which are disregarded in arriving at the handicap, in accordance with the preceding description. Pieces 17 have a common unvarying end-to-end width which is arbitrarily chosen the same as the end-to-end width of an "active" piece 16 corresponding to a score of 60. They preferably have the designation "High" on their forward face to indicate their special character, together with a score indicium.

This indicium guides the handicapper in removing a "high" piece 17 from the series of pieces when the piece to be added to the series is a "high" one and would increase their number to more than five. If the current or latest piece is a "high" piece and there are already five "high" pieces in the series, the first step is to remove the oldest or left-hand piece of the series, whether it is an "active" or "high" piece. This insures that the addition to the series of the latest "high" piece will maintain the number of pieces. Should the newly added "high" piece increase the number of "highs" above five, then the lowest "high" already in place is changed to an "active" piece of the same value, reflected in the width of that piece. Five "high" pieces must always be present in the series.

It may very well be that other computations to which device 10 is suited will also involve the use of uniformly dimensioned pieces whose function is generally like that of the "high" pieces, for putting into effect a system of calculations of a special type. Again, if, in accordance with another sort of sports handicapping or other rules, the result is arrived at on the basis of the entire number of a series of current scores or other values, rather than a part thereof, the "high" pieces 17 will not be required.

In the interest of preventing longitudinal tumbling of the pieces in the groove 15 of the holder 11, it is desirable to provide an overhanging or depending lip 20 thereon. This feature is illustrated as being applied only to the "high" pieces 17, in order to distinguish the same physically from the "active" pieces.

In accordance with the invention, the forward face 14 of the holder 11 is appropriately calibrated in the lengthwise direction to enable a direct reading of a player's handicap to be taken therefrom. This calibration includes two scales, designated 22, 23 respectively, both scales being linearly calibrated. Scale 22 is arbitrarily marked off in terms of total strokes, the markings commencing with the numeral 600 which represents the total of ten rounds at the theoretical minimum score of 60 strokes. The 600 mark is located at a point along the length of the holder which is spaced from the left-hand end of groove 15 a distance corresponding to 5 times the width of one of the "high" pieces 17. Therefore, the device automatically takes into account the effect of the five high games in commencing its scale indicia as stated. Inasmuch as the width of the "active" pieces is in accordance with a number of stroke increments in excess of the theoretical minimum score of 60, the combined width of 10 thereof, in the direction of the length of groove 15 will represent proportionately the total number of strokes expended by the player in ten rounds, and this total may be read off directly from the scale 22.

The scale 23 is arbitrarily marked off in terms of handicap values. This calibration may be taken from a published tabulation of the sort referred to above, or in the absence of such tabulation, handicap values corresponding to the stroke totals which appear on scale 22 may be computed, on the basis of par for the course in question, and appropriately marked in parallel relation to that scale.

An indicator and positioning unit or device 24, hereinafter described in greater detail, is frictionally engaged in groove 15 for sliding movement therein to engage the endmost of the fifteen pieces and thus maintain them snugly against one another, with the remote or left-hand piece in abutting engagement with the left-hand end of slot or groove 15.

From the foregoing, it is evident that, with the required number of computation pieces in place in groove or slot 15, including both "high" and "active" pieces, the indicating device 24 will point off directly on the scale 23 the handicap of the player in question.

In use, each player of a club will be furnished with a holder 11 of the type illustrated in Figs. 1 through 6, and there will be maintained in the groove 15 of that holder, in end-to-end series and in abutment with the left-hand extremity of the groove, fifteen of the computation pieces, of which five, and no more than five, will be the "high," uniformly sized pieces 17 and the remaining ten will be "active," variably sized blocks 16. Thereafter, as each additional current score is handed in, a piece 16 corresponding to that score is selected and placed immediately to the left of the indicator 24, and the piece at the opposite, left-hand end of the row of fifteen is removed and returned to a suitable bin or rack.

It will be understood that the length of the series of pieces, the number of pieces therein, the type of calibrations on scales 22, 23, or either thereof, and the limits of these calibrations are susceptible of change in accordance with the requirements of the particular calculation, sporting or otherwise.

At the beginning of a season's play, or at any time in the case of players who have not completed the required fifteen rounds upon which calculation of a handicap is based, certain provisions may be made for the use of the present device to calculate a provisional handicap; however, inasmuch as this matter does not bear upon structural features of the present invention, no further detailed discussion thereof is in order.

Structural details of the indicator 24 are illustrated in Figs. 10 and 11 of the drawings. This indicator may take various forms, but a simple unit may be constructed of a small sheet of spring metal bent to provide a resilient body 25 of U-shaped form. The respective legs of body 25 may be compressed to enable the body to be inserted in groove 15, in the fashion illustrated in Fig. 1; thereafter the same exerts frictional retaining action of the wall of the groove, yet may be readily slid along the same. The uppermost leg may be provided with a pair of parallel slots 26, 26' extending lengthwise of the groove 15 for the reception of an adjustable indicator element 27. The latter may be stamped out of sheet metal in the generally L-shaped cross sectional form shown in Fig. 11.

Element 27 includes a portion 28 which is adapted for sliding adjustment along the adjacent leg of body 25, this portion being hooked over at 29 for sliding engagement in the slot 26. A clamping screw 30 is associated with the portion 28, extending through the other slot 26' and thus enabling element 27 to be adjustably clamped to the body 25 at any desired longitudinal position. Portion 28 of the indicating element terminates in an upwardly disposed finger or pointer 31 which is so positioned relative to the depth of body 25 that it lies closely adjacent and parallel to the forward face 14 of holder 11 when the indicator 24 is fully inserted in groove 15. This finger lies adjacent calibrations 22, 23.

The purpose of employing an adjustable indicator device 24 is to enable the latter to be appropriately set in accordance with the par rating of the golf course in question, on the understanding that courses are commonly rated in terms of their par. This commonly ranges between 67 strokes and 75 strokes for an 18-hole course. A calibrated scale 32, marked off in terms of course par may be applied to the upper leg of the U-shaped body 25 adjacent the indicator element 27, enabling that element to be appropriately adjusted and permanently clamped to body 25 in a position with reference to scale 32 which corresponds to the rating of the club in question. This adapts the calculating device 10 to the use of any club.

The adjustable indicator shown may be varied considerably and still fulfill its intended function referred to above. Other expedients will also enable adjustment of device 10 to the rating of a number of different courses. For example, either one or both of the scales 22, 23 may be made longitudinally adjustable on holder 11.

The invention likewise contemplates a suitable arrangement for receiving and maintaining in alphabetical order a relatively large number of the calculating devices 10, each identified with the name of one of the club members. Thus handicaps may be kept current and in a neat and orderly manner, readily available for inspection, notwithstanding changes in membership.

For this purpose we provide a suitable multiple panel rack R, for instance as illustrated in Figs. 7, 8 and 9. This may include a sheet metal backing plate 33 provided with pairs of vertically extending side members 34 opening at the top of the rack and each having an inturned forward holder retaining flange 35 at its opposite sides. The distance between each pair of opposed members 34 will be slightly greater than the length of one of the holders 11, enabling a number of holders to be easily inserted in or removed from the front of the rack.

An angled filler or shim 36 may be placed at the bottom of each rack, as shown in Fig. 9, for the purpose of tilting the stack of holders 11 upwardly a bit and thereby facilitating inspection and manipulation.

If a membership change requires the removal or addition of a holder, this may be done by simply lifting a number of the holders 11 in the alphabetically arranged vertical series and by inserting or removing the holder of the member involved in the change. If desired, additional bins or rack spaces, generally designated 37, may be employed below the active holder rack for the reception of extra calculating pieces, 16, 17.

Since the device and system are generally applicable to calculations which involve the addition, subtraction, comparison or averaging of multiple values, as well as further manipulations involving these values or the resultant thereof, it is to be understood that terms such as "value," "result," "calculation," "interpretation" and the like, as employed above and in the claims, are to be construed in their broadest sense unless clearly qualified by other terminology.

We claim:

1. A system for the automatic calculation of handicaps and other variable values, comprising a rack adapted to receive and maintain in removable relation to one another a series of vertically arranged, horizontally extending calculating devices, and a plurality of elongated, straight sided calculating devices arranged on said rack in such a series, a longitudinally extending scale on each of said devices calibrated in terms interpretive of said values, a plurality of calculating pieces variably proportioned in side-to-side dimension in general accordance with said values, said device having means to mount said pieces in side-by-side series extending longitudinally of said scale on each of said devices, and an indicator variably positioned relative to the scale in accordance with the over-all length of said last named series, said indicator coacting with said scale to afford a direct reading from the latter.

2. A system for the automatic calculation of handicaps and other variable values, comprising a rack adapted to receive and maintain in removable relation to one another a series of vertically arranged, horizontally extending calculating devices, and a plurality of elongated, straight sided calculating devices arranged on said rack in such a series, said devices resting directly upon one another and each comprising a longitudinally extending scale calibrated in terms interpretive of said values, a plurality of calculating pieces variably proportioned in side-to-side dimension in general accordance with said values, said device having means to mount said pieces in side-by-side series extending longitudinally of said scale, and an indicator on each of said devices variably positioned relative to the scale thereof in accordance with the over-all length of said last named series, said indicator coacting with said scale to afford a direct reading from the latter.

JEAN S. JENSON.
ARTHUR H. JENSON.

REFERENCES CITED

The following references are of record in the file of this patent:

UNITED STATES PATENTS

| Number | Name | Date |
| --- | --- | --- |
| 357,361 | Benham | Feb. 8, 1887 |
| 715,197 | Daly | Dec. 2, 1902 |
| 715,199 | Daly | Dec. 2, 1902 |